United States Patent [19]

Stanley

[11] Patent Number: 4,809,403
[45] Date of Patent: Mar. 7, 1989

[54] COLLAPSIBLE PRESIZING RINGS

[75] Inventor: Thomas R. Stanley, Danville, Ill.

[73] Assignee: Teepak, Inc., Oak Brook, Ill.

[21] Appl. No.: 180,506

[22] Filed: Apr. 12, 1988

[51] Int. Cl.$^4$ .............................................. A22C 11/02
[52] U.S. Cl. ................................................. 17/41; 17/49
[58] Field of Search .................. 17/33, 35, 41, 42, 49

[56] References Cited

U.S. PATENT DOCUMENTS

| 4,007,761 | 2/1977 | Beckman | 138/103 |
|---|---|---|---|
| 4,034,441 | 7/1977 | Kupcikevicius et al. | 17/41 |
| 4,077,090 | 3/1978 | Frey et al. | 17/41 |
| 4,164,057 | 8/1979 | Frey et al. | 17/49 |
| 4,202,075 | 5/1980 | Michel et al. | 17/41 |
| 4,335,488 | 6/1982 | Becker | 17/33 |
| 4,512,059 | 4/1985 | Beckman | 17/45 |
| 4,528,719 | 7/1985 | Frey | 17/49 |
| 4,535,508 | 8/1985 | Aceto | 17/49 |

Primary Examiner—Willie G. Abercrombie
Attorney, Agent, or Firm—Howard M. Ellis; Michael L. Dunn

[57] ABSTRACT

A collapsible ring for sizing food casing during stuffing can be reduced in size for insertion onto the deshirred end of a shirred strand for efficient packaging and storage. The sizing ring is automatically expanded to the desired sizing diameter when the casing-sizing ring unit is inserted onto the stuffing horn of a filling machine.

18 Claims, 2 Drawing Sheets

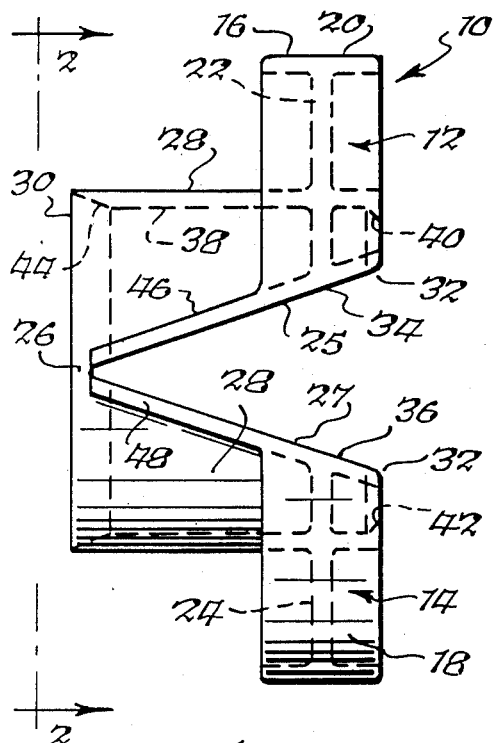

COLLAPSIBLE PRESIZING RINGS

BACKGROUND OF THE INVENTION

The present invention relates generally to new and useful devices for packaging food products, and more specifically, to improved presizing devices for tubular food casings.

In the manufacture of sausage products, a tubular food casing, such as nonedible cellulose is loaded onto the stuffing horn of a filling machine and stuffed with an emulsion, usually comprised of comminuted meat together with fillers, seasonings, spices, etc. In the case of small sausage products, like frankfurters, the filled casings are twisted, tied or clipped into suitable links at predetermined intervals and further processed. For larger sausage products, like bolognas, salami and the like, the meat emulsion is introduced into larger, heavier walled fibrous type casings and formed into chubs or lengthy individual sausage sticks.

In preparing large diameter sausage products, like bologna, an important consideration is the maintenance of accurate size control over the entire length of the sausage stick. It is particularly important that the diameter of large sausage products be carefully controlled so that meat packers are able to cut the sausage into slices of predetermined thickness and diameter for prepackaging. The objective is to have a given number of slices weigh precisely a predetermined amount for each package.

In stuffing larger sausage products, however, there is some tendency for diameter variations to occur which may be due to varying stretch properties of casings and meat emulsion charging pressures. There may be less variation in product diameter with sausage stuffed in fibrous casings than nonreinforced type casings. Nevertheless, meat processors are constantly striving to improve operations that affect finished package yields. Constant control during stuffing of green stick diameter assures more uniform slice weight and minimizes package over and under weight variations.

To facilitate stuffing and also obtain greater dimensional uniformity in filling larger food casings, presizing devices have been used for diametrical stretching. This is achieved by longitudinally passing tubular casing prior to filling, in most instances over a stationary type sizing device which operates to stretch the casing to the stuffed diameter recommended by the manufacturer. In addition to the stretching action of the presizing device, casing moving over some devices generates friction. This creates drag or holdback forces on the casing increasing the diameter of the filled casing and vice versa depending on the extent of the forces being exerted.

To improve stuffing efficiency, U.S. Pat. No. 4,007,761 (Beckman) discloses a self-sustaining tubular casing article with a presizing ring prepackaged in the deshirred end of a shirred strand. The objective is to facilitate the filling process by engaging both a new shirred strand of casing together with a presizing ring to the stuffing horn in a single operation. Others, such as U.S. Pat. Nos. 4,512,059; 4,528,719 and 4,535,508 have sought to improve on the Beckman concept by means of expandable sizing rings of the type which can be readily attached to stuffing machines by also prepackaging in the deshirred end of strands. After engaging the strand with the stuffing horn the sizing ring can be expanded from unexpanded state to a casing stretching size by manipulation of the ring on the horn directly through the casing wall. This facilitates both assembly and use of the casing/sizing ring article, since it can be more easily implanted into the casing by the casing manufacturer in a collapsed state, and later expanded to a casing stretching size by meat processors.

The foregoing expandable presizing devices are based on rather costly, noneconomic design concepts particularly in view of the fact that many are disposable or "throw-away" after use articles. For example, the presizing discs of U.S. Pat. No. 4,535,508 comprise a multiplicity of radial arms each having a nonmovable rod passing through a hollow guide. The outer end of each rod has a flattened casing contact which engages with the interior wall of the casing on the horn when inner rod lifters are compressed when mounting to the stuffing horn. U.S. Pat. No. 4,512,059 discloses a device having a plurality of petal-like sizing members arranged around a central hub. Expansion of the petals to size the casing is dependent on each making frictional contact with the casing during stuffing instead of being automatically expanded upon engagement with the stuffing horn like U.S. Pat. No. 4,535,508. U.S. Pat. No. 4,528,719 discloses a two-piece sizing ring comprising a casing engaging first element and a rigid disc second element. In order to expand the first element for engaging with the casing, the second inner disc must be compressed to engage with the first element. Although such sizing devices are useful, production costs would detract from their generally wide acceptance.

Accordingly, there is need for a more economic collapsible sizing device which is marketable either as an element of a shirred strand-sizing device combination, or as a separate article of commerce. That is to say, a component of a casing article, preferably together with a shirred strand where the device is implanted into an unshirred portion of the strand and the casing closed over the device. Preferably, the device in a collapsed state will have a diameter which is smaller than the unshirred, unstretched casing permitting easy insertion into the unshirred end of the casing.

SUMMARY OF THE INVENTION

It is therefore a principal objective of the invention to provide for a collapsible sizing ring for mounting onto a stuffing horn for stuffing a food casing, the sizing ring comprising at least first and second sizing sections, the sizing sections comprising engaging surfaces which together form a sizing surface for engaging the inside surface of the casing for sizing. The first sizing section is pivotally joined to the second sizing section permitting the engaging surface of the first sizing section to be movable relative to the engaging surface of the second sizing section to permit variation of the effective circumference of the sizing surface. The sizing sections have internal surfaces sized so that they are forced apart by the stuffing horn upon engagement therewith, which in turn, separates the engaging surfaces to increase the effective circumference of the sizing surface to size the casing.

A still further objective of the present invention is to provide for a collapsible sizing ring for mounting on a stuffing horn comprising a collar-like mounting means for circumferentially engaging with the stuffing horn. The mounting means comprises spaced first and second peripheral edges. The sizing ring also has a sizing surface adjacent to the second peripheral edge extending radially from the mounting means for engaging the inside surface of a food casing for sizing, and at least two collapsing grooves dividing the sizing ring into at least first and second sizing sections each with a casing engaging surface. The first sizing section is pivotally joined to the second sizing section permitting the engaging surface of the first sizing section to be movable relative to the engaging surface of the second sizing section to permit variation of the effective circumference of the sizing surface, including forcing the sizing sections apart by the stuffing horn upon engagement therewith in order to increase the effective circumference of the sizing surface.

Preferably, the sizing devices include the collapsing grooves between the pivotally joined sizing sections running from their pivotal joint adjacent to the first peripheral edge to the second peripheral edge. The collapsing grooves may be comprised of tapered slots for a reduction in the effective circumference of the sizing surface when not engaged with the stuffing horn.

Accordingly, it is still a further object of the invention to facilitate use of the foregoing sizing rings by providing casing articles or units having rings of reduced diameter implanted in a length of casing. That is to say, use of the sizing rings can be facilitated by enclosing in a collapsed or unexpanded state inside an unshirred end of a shirred strand of food film. Because the diameter of the sizing surface of the presizing ring in a collapsed state will be smaller than the diameter of the unshirred or unstretched casing, packaging the sizing ring in the unshirred end of a shirred strand can be easily performed. This provides the added benefit of greater packaging efficiencies of the shirred casing-sizing ring units in shipping and storage containers because casing articles having sizing rings in a collapsed state require less space for storage than when fully expanded. It will be observed that the collapsible sizing rings are automatically expanded to a casing stretching diameter when mounted onto the stuffing horn of a filling machine which action forces the sizing sections apart to increase the effective circumference of the sizing surface. Expansion of the casing engaging surfaces of the collapsible sizing ring are not dependent on commencing stuffing operations.

DESCRIPTION OF THE DRAWINGS

For a further understanding of the invention as well as its characterizing features, reference should now be made to the following detailed description thereof taken in conjunction with the accompanying drawings, wherein:

FIG. 1 is a side elevational view of the collapsible sizing ring in an expanded state.

FIG. 2 is an end view of the expanded collapsible sizing ring taken along, line 2—2 of FIG. 1.

FIG. 3 is a side elevational view of the collapsible sizing ring of FIG. 1 except in a collapsed condition.

FIG. 4 is an end view of the collapsed sizing ring taken along line 4—4 of FIG. 3.

DETAILED DESCRIPTION OF THE INVENTION

Turning first to FIG. 1 there is shown a collapsible sizing ring 10 fabricated from any suitable plastic, such as PVC, and more preferably, rigid food grade materials, such as the polyolefins, like polypropylene, polyethylene and especially high density polyethylenes. Suitable metals and metal alloys like aluminum, stainless steels and other lightweight materials can also be used. However, since the sizing ring contemplated can be a disposable article, lower cost plastics would be most preferred.

Collapsible sizing ring 10 as shown in FIG. 1 comprises two sizing sections, a first sizing section 12 and a second sizing section 14. Although the sizing ring is shown in a preferred embodiment with two sizing sections joined together at 26, the invention also contemplates collapsible sizing rings comprised of three and four sizing sections joined together in an equivalent manner.

Figure 6:
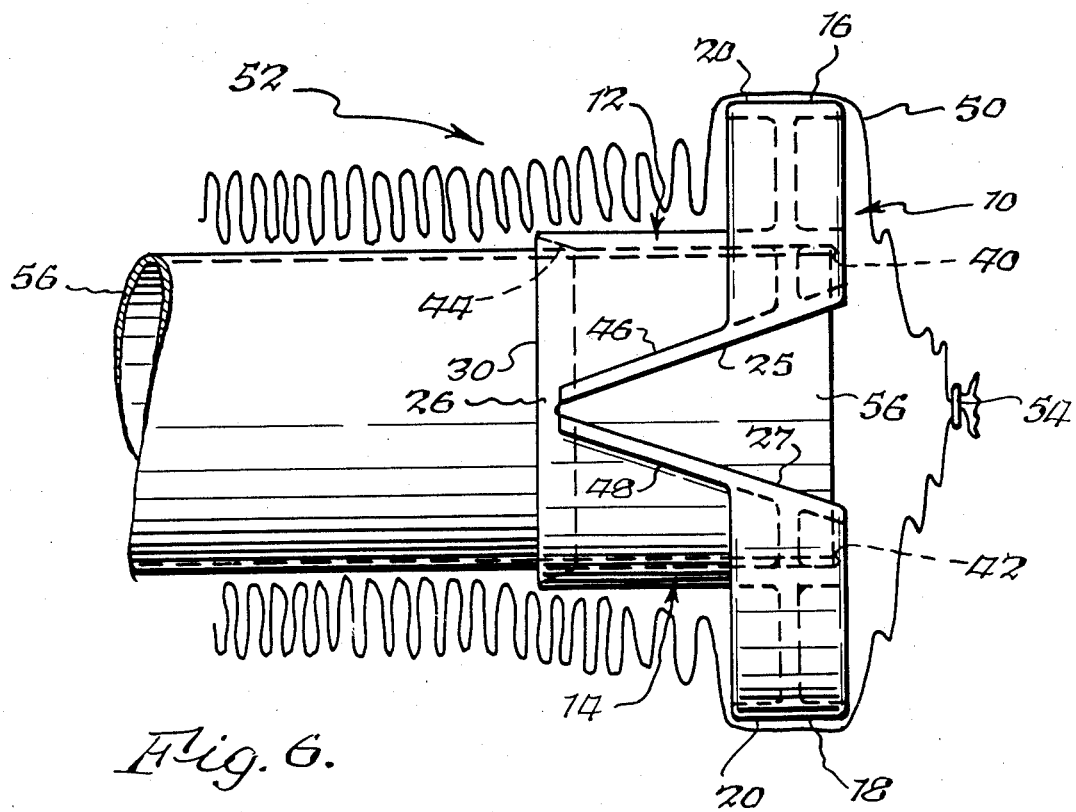
FIG. 6 is a side sectional view of the casing article of FIG. 5 mounted on a stuffing horn with the collapsible sizing ring mounted thereon in an expanded state for stretching the shirred casing to the stuffed diameter recommended by the manufacturer.

First sizing section 12 and second sizing section 14 include casing engaging surfaces 16 and 18 with radial supporting walls 22 and 24, respectively. Casing engaging surfaces 16 and 18 in combination provide a casing sizing surface 20 (FIG. 2), such that when sizing ring 10 is expanded (FIGS. 1 and 2) the sizing surface engages and stretches the interior wall of the food casing during the stuffing process, as best illustrated by FIG. 6. Sizing sections 12 and 14 are pivotally joined at 26 which together form an annular mounting collar 28 permitting each sizing section of the ring to articulate from an expanded position (FIGS. 1 and 2) to a collapsed state (FIGS. 3 and 4) and vice-versa. When mounted onto a stuffing horn (56) of a filling machine, the "effective circumference" of sizing surface 20, which includes gaps 25 and 27, is enlarged to the casing manufacturer's specified filled casing diameter. Similarly, prior to mounting onto the stuffing horn the effective circumference of sizing surface 20 can be significantly reduced by holding and compressing the sizing sections together causing the sizing ring to assume its collapsed position.

The internal surface 38 of annular mounting collar 28 is sized for frictional engagement with a stuffing horn by inserting the first peripheral edge 30 of the mounting collar against the outlet edge of the stuffing horn and sliding the sizing ring onto the stuffing horn. First peripheral edge 30 may have a beveled edge 44 for easier, more efficient engagement of the sizing ring with the horn. Mounting collar 28 includes a second peripheral edge 32 at the end opposite first peripheral edge 30. Sizing sections 12 and 14 preferably include ring stops 40 and 42, respectively, at the second peripheral edge comprising narrow inwardly biased annular ridges for engaging with the outlet end of the stuffing horn when the sizing ring is fully mounted. Stops 40 and 42 also provide added stability to the sizing ring when mounted on the horn.

Triangular-shaped reinforcements 46 and 48 may be employed along gap edges 34 and 36 for added rigidity for sizing surface 20. Reinforcements 46 and 48 butt against radial supporting walls 22 and 24, and are tapered towards joint 26.

Gaps 25 and 27 are substantially V-shaped having their widest separation at second peripheral edge 32 when mounted on the stuffing horn. Gap edges 34 and 36 converge at joint 26 where the first and second sizing sections are connected for movement, one relative to the other. FIGS. 3 and 4 show ring 10 with V-shaped gaps 25 and 27 closed, i.e., in a collapsed arrangement before mounting onto the stuffing horn. In accordance with FIGS. 3 and 4, where sizing sections 12 and 14 are fully collapsed, gap edges 34 and 36 may adjoin one another to substantially reduce the effective circumference of sizing surface 20. This permits efficient and convenient packaging of the sizing ring in the terminal portion of the deshirred end of a strand of shirred casing. In addition, because of the reduced diameter of the collapsible sizing ring, a combination package of shirred food casing and the sizing ring can be packaged more efficiently for storage and shipping. That is, most of the available packaging space in a multi-strand packaging and shipping caddy can be utilized with the collapsible sizing rings of the present invention.

Figure 5:
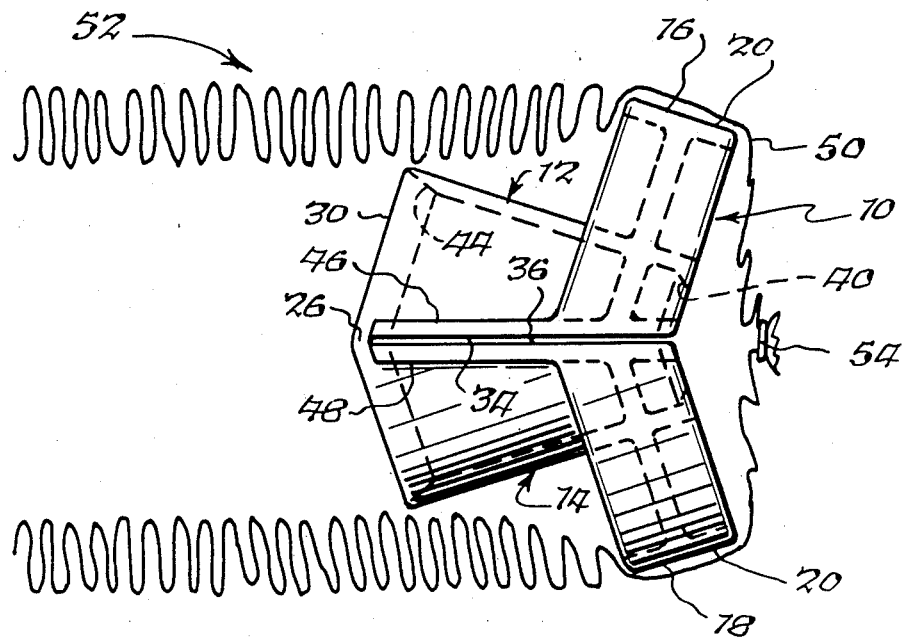
FIG. 5 is a side sectional view of the collapsible sizing ring packaged in the unshirred end of a shirred strand prior to engagement with a stuffing horn.

The foregoing prepackaged casing article in which the collapsible sizing ring is packaged subsequent to shirring may be prepared by deshirring the terminal pleats of the strand and inserting the sizing ring inside the deshirred casing 50 and an end closure clip 54 applied thereto. The circumference of sizing surface 20 of the collapsed ring is less than that of the unstretched deshirred casing making insertion of the sizing ring into the deshirred end (FIG. 5) effortless.

The shirred casing-collapsible presizing ring article may be installed on a stuffing horn 56 (FIG. 6) of a filling machine as a single unit. Shirred casing 52 is first inserted onto the stuffing horn in the usual manner, followed by the sizing ring where the stuffing horn causes separation of the sizing sections simultaneously. Sizing surface 20 is then in stretching engagement with the interior wall of the casing.

Although the invention has been described in considerable detail with respect to the preferred embodiments thereof, it will be apparent that the invention is capable of numerous modifications and variations to those skilled in the art without departing from the spirit and scope of the invention, as defined in the appended claims.

I claim:

1. A collapsible sizing ring for mounting on a stuffing horn for stuffing a food casing, said sizing ring comprising at least first and second sizing sections, said sizing sections comprising engaging surfaces, which engaging surfaces together form a sizing surface for engaging the inside surface of said casing for sizing, said first sizing section being pivotally joined to said second sizing section permitting the engaging surface of the first sizing section to be movable relative to the engaging surface of the second sizing section to permit variation of the effective circumference of the sizing surface, said sizing sections having internal surfaces sized so that they are forced apart by the stuffing horn upon engagement therewith, which in turn separates said engaging surfaces to increase the effective circumference of the sizing surface to size said casing.

2. The sizing ring of claim 1 wherein said internal surfaces of said sizing sections include means for mounting onto a stuffing horn.

3. The sizing ring of claim 2 wherein said means for mounting onto a stuffing horn comprises a collar-like member for circumferentially engaging with said stuffing horn, said collar-like member including spaced first and second peripheral edges.

4. The sizing ring of claim 3 wherein said sizing sections are pivotally joined in the region of the first peripheral edge and said casing engaging surfaces extend radially from the collar-like member adjacent to said second peripheral edge.

5. The sizing ring of claim 4 including collapsing grooves between said pivotally joined sizing sections running from said joined sections to said second peripheral edge.

6. The sizing ring of claim 5 wherein said collapsing grooves are comprised of tapered slots between said sizing sections allowing a reduction in the effective circumference of said sizing surface prior to engagement with said stuffing horn.

7. The sizing ring of claim 5 wherein said collapsing grooves are comprised of tapered slots in said collar-like member and casing engaging surfaces allowing a reduction in the effective circumference of said sizing surface prior to engagement with said stuffing horn.

8. A collapsible sizing ring for mounting on a stuffing horn comprising a collar-like mounting means for circumferentially engaging with said stuffing horn, said mounting means comprising spaced first and second peripheral edges, a sizing surface adjacent to said second peripheral edge extending radially from said mounting means for engaging the inside surface of a food casing for sizing, and at least two collapsing grooves dividing the sizing ring into at least first and second sizing sections each with a casing engaging surface, said first sizing section being pivotally joined to said second sizing section adjacent to said first peripheral edge permitting the engaging surface of said first sizing section to be movable relative to the engaging surface of said section sizing section for variation of the effective circumference of said sizing surface, including forcing said sizing sections apart by the stuffing horn upon engagement therewith to increase the effective circumference of said sizing surface.

9. The sizing ring of claim 8 wherein the collapsing grooves are tapered.

10. A food casing article which comprises a shirred strand of tubular food film in combination with the collapsible sizing ring of claim 1.

11. The food casing article of claim 10 wherein one end of said strand comprises deshirred film and the collapsible sizing ring is packaged inside said deshirred film.

12. The food casing article of claim 11 mounted on a stuffing horn of the filling machine.

13. A food casing article which comprises a shirred strand of tubular food film in combination with the collapsible sizing ring of claim 5.

14. The food casing article of claim 13 wherein one end of said strand comprises deshirred film and the collapsible sizing ring is packaged inside said deshirred film.

15. The food casing article of claim 14 mounted on a stuffing horn of a filling machine.

16. A food casing article which comprises a shirred strand of tubular food film in combination with the collapsible sizing of claim 8.

17. The food casing article of claim 16 wherein one end of said strand comprises the shirred film and the collapsible sizing ring is packaged inside said deshirred film.

18. The food casing article of claim 17 mounted on a stuffing horn of a filling machine.

* * * * *

UNITED STATES PATENT AND TRADEMARK OFFICE
CERTIFICATE OF CORRECTION

PATENT NO. : 4,809,403

DATED : March 7, 1989

INVENTOR(S) : Thomas R. Stanley

It is certified that error appears in the above-identified patent and that said Letters Patent is hereby corrected as shown below:

Column 6, line 32 (Claim 8), "section", first occurrence, should read ---second---.

Signed and Sealed this

Seventeenth Day of October, 1989

Attest:

DONALD J. QUIGG

Attesting Officer

Commissioner of Patents and Trademarks